United States Patent
Zhang et al.

(10) Patent No.: US 9,257,078 B2
(45) Date of Patent: Feb. 9, 2016

(54) LED BACKLIGHT DRIVING CIRCUIT HAVING DIVIDER UNITS AND METHOD FOR DRIVING THE LED BACKLIGHT DRIVING CIRCUIT

(71) Applicant: SHENZHEN CHINA STAR OPTOELECTRONICS TECHNOLOGY CO., LTD, Shenzhen (CN)

(72) Inventors: Hua Zhang, Shenzhen (CN); Fei Li, Shenzhen (CN)

(*) Notice: Subject to any disclaimer, the term of this patent is extended or adjusted under 35 U.S.C. 154(b) by 291 days.

(21) Appl. No.: 14/112,567

(22) PCT Filed: Jun. 28, 2013

(86) PCT No.: PCT/CN2013/078312
§ 371 (c)(1),
(2) Date: Oct. 18, 2013

(87) PCT Pub. No.: WO2014/180057
PCT Pub. Date: Nov. 13, 2014

(65) Prior Publication Data
US 2014/0333520 A1    Nov. 13, 2014

(30) Foreign Application Priority Data
May 8, 2013    (CN) .......................... 2013 1 0167123

(51) Int. Cl.
G09G 3/36    (2006.01)
G09G 3/34    (2006.01)
H05B 33/08   (2006.01)

(52) U.S. Cl.
CPC ............... *G09G 3/36* (2013.01); *G09G 3/3406* (2013.01); *H05B 33/0815* (2013.01); *H05B 33/0851* (2013.01); *H05B 33/0887* (2013.01)

(58) Field of Classification Search
CPC ....................................................... G09G 3/34
USPC ...................................................... 345/102
See application file for complete search history.

(56) References Cited

U.S. PATENT DOCUMENTS

| 7,944,661 B2* | 5/2011 | Kim ..................... G09G 5/006 345/102 |
| 2008/0094349 A1* | 4/2008 | Liao .................. G02F 1/133603 345/102 |

(Continued)

FOREIGN PATENT DOCUMENTS

CN    2838200 Y     11/2006
CN    101882424 A   11/2010

(Continued)

OTHER PUBLICATIONS

Wang Weiwei, the International Searching Authority written comments, Jan. 2014, CN.

*Primary Examiner* — Roy Rabindranath

(57) ABSTRACT

A light emitting diode (LED) backlight driving circuit includes a power supply, an LED light bar coupled to the power supply, a constant current driving chip that drives the LED light bar to light, and a comparing unit. The constant current driving chip includes an under-voltage protection pin that receives an under-voltage protection signal. An overvoltage collecting unit of the LED backlight driving circuit and an under-voltage collecting unit of the LED backlight driving circuit are coupled to an input end of the power supply, and an output voltage of the under-voltage collecting unit is directly input to the under-voltage protection pin. A reference voltage is input to a first input end of the comparing unit, and a second input end of the comparing unit is coupled to the overvoltage collecting unit. When an output voltage of the overvoltage collecting unit exceeds the reference voltage, the comparing unit sends the under-voltage protection signal to the under-voltage protection pin.

16 Claims, 2 Drawing Sheets

(56) References Cited

U.S. PATENT DOCUMENTS

| | | |
|---|---|---|
| 2009/0289559 A1 | 11/2009 | Tanaka et al. |
| 2011/0018906 A1* | 1/2011 | Chiu ............... H05B 33/08 345/690 |
| 2011/0157246 A1* | 6/2011 | Jang ................ G09G 3/3406 345/690 |
| 2014/0168052 A1* | 6/2014 | Zhang ............ H05B 33/0887 345/102 |

FOREIGN PATENT DOCUMENTS

| | | |
|---|---|---|
| CN | 102256415 A | 11/2011 |
| CN | 202334999 U | 7/2012 |
| CN | 102740538 A | 10/2012 |
| CN | 103021346 A | 4/2013 |
| CN | 103050092 A | 4/2013 |
| CN | 103065588 A | 4/2013 |
| CN | 103065589 A | 4/2013 |
| JP | 2011199220 A | 10/2011 |

* cited by examiner

LED BACKLIGHT DRIVING CIRCUIT HAVING DIVIDER UNITS AND METHOD FOR DRIVING THE LED BACKLIGHT DRIVING CIRCUIT

TECHNICAL FIELD

The present disclosure relates to the field of a display device, and more particularly to a light emitting diode (LED) backlight driving circuit, a backlight unit, and a liquid crystal display (LCD) device.

BACKGROUND

A liquid crystal display (LCD) device includes an LCD panel and a backlight unit that provides a light source for the LCD panel, where the backlight unit includes a light emitting diode (LED) backlight driving circuit. As shown in FIG. 1, the LED backlight driving circuit includes a power supply, an LED light bar coupled to an output end of the power supply, and a constant current driving chip that drives the LED light bar to light. When voltage of the LED backlight driving circuit decreases, output current of the power supply increases, which easily damages components of the LED backlight driving circuit. Thus, an under-voltage protection pin of the constant current driving chip avoids voltage damages to the components of the LED backlight driving circuit, where the under-voltage protection pin detects an output voltage of the power supply. When voltage of the under-voltage protection pin is less than a trigger voltage of an inside of the constant current driving chip, the constant current driving chip performs a protection function, which allows an entire LED backlight driving circuit to stop working.

A typical LED constant current driving chip has only a function of under-voltage protection, when an input voltage of the constant current driving chip is too great, namely exceeds a range accepted by the constant current driving chip, which damages the constant current driving chip and affects the entire LED backlight driving circuit.

SUMMARY

In view of the above-described problems, the aim of the present disclosure is provides a light emitting diode (LED) backlight driving circuit, a backlight unit, and a liquid crystal display (LCD) device capable of having an overvoltage protection function when a constant current driving chip only having an under-voltage protection pin.

The purpose of the present disclosure is achieved by the following technical schemes:

A light emitting diode (LED) backlight driving circuit comprises a power supply, an LED light bar coupled to the power supply, a constant current driving chip that drives the LED light bar to light, and a comparing unit. The constant current driving chip comprises an under-voltage protection pin that receives an under-voltage protection signal. An overvoltage collecting unit of the LED backlight driving circuit and an under-voltage collecting unit of the LED backlight driving circuit are coupled to an input end of the power supply, and an output voltage of the under-voltage collecting unit is directly input to the under-voltage protection pin. A reference voltage is input to a first input end of the comparing unit, and a second input end of the comparing unit is coupled to the overvoltage collecting unit. When an output voltage of the overvoltage collecting unit exceeds the reference voltage, the comparing unit sends the under-voltage protection signal to the under-voltage protection pin.

Furthermore, the under-voltage protection signal is a low level signal. The overvoltage collecting unit comprises a first divider unit and a second divider unit that are connected in series between the input end of the power supply and a ground terminal, the first input end of the comparing unit is a non-inverting input end, and the second input end of the comparing unit is an inverting input end. When voltage of the second divider unit exceeds the reference voltage, the comparing unit sends the low level signal to the under-voltage protection pin. This is an exemplary overvoltage collecting unit, which uses a resistor divider method to receive the voltage of the input end of the power supply, which simplifies circuit structure and reduces costs.

Furthermore, the under-voltage collecting unit comprises a third divider unit and a fourth divider unit that are connected in series between the input end of the power supply and a ground terminal, and voltage of the fourth divider unit is sent to the under-voltage protection pin. This is an exemplary under-voltage collecting unit, which uses the resistor divider method to receive voltage of the input end of the power supply, which simplifies circuit structure and reduces costs.

Furthermore, the power supply comprises a first inductor, a first diode, a voltage adjusting controllable switch, and a filter capacitor. A first end of the first inductor is coupled to the input end of the power supply, a second end of the first inductor is coupled to an anode of the first diode, and a cathode of the first diode is connected with an input end of the LED light bar. The filter capacitor is connected in series between the cathode of the first diode and a ground terminal, and the voltage adjusting controllable switch is connected in series between the anode of the first diode and the ground terminal. This is an exemplary circuit structure of the power supply.

Furthermore, the constant current driving chip further comprises a protection unit coupled to the under-voltage protection pin, and a control unit coupled to the protection unit, where the control unit controls the power supply to turn on/off. When the under-voltage protection signal is sent to the protection unit, the protection unit controls the control unit to turn off the power supply. This is an exemplary protection circuit, voltage of the under-voltage protection signal is determined by the protection unit, when the voltage of the under-voltage protection signal is less than a preset voltage, the protection unit sends a protection signal to the control unit, thus the control unit turns off the voltage adjusting controllable switch of the power supply thereby protecting the LED backlight circuit.

Furthermore, the constant current driving chip further comprises a detection unit that detects an output current of the LED light bar, where the detection unit is coupled to the control unit. A divider resistor is connected in series between an output end of the LED light bar and a ground terminal, and voltage of the divider resistor is fed back to the detection unit. The present disclosure transforms output current of each of the LED light bars into the voltage signal by the resistor divider method. The voltage signal is detected by the detection unit, and current data of each of the LED light bars detected by the detection unit is fed back to the control unit. The control unit adjusts an output voltage of the power supply by compared current brightness requirement with actual brightness of the LED light bar, where the actual brightness of the LED light bar is obtained through current data of the LED light bar.

Furthermore, the constant current driving chip further comprises a voltage conversion unit coupled to the input end of the power supply, and the voltage conversion unit outputs the reference voltage to the comparing unit. The voltage conversion unit directly receives voltage from the input end of the power supply, and converts the voltage into the reference voltage required by the comparing unit. The voltage conversion unit is integrated in the constant current driving chip, and the reference voltage can be flexibly set according to different overvoltage protection thresholds, thereby improving universality of the constant current driving chip.

Furthermore, the under-voltage protection signal is a low level signal. The overvoltage collecting unit comprises a first divider unit and a second divider unit that are connected in series between the input end of the power supply and a ground terminal, the first input end of the comparing unit is a non-inverting input end, and the second input end of the comparing unit is an inverting input end. When voltage of the second divider unit exceeds the reference voltage, the comparing unit sends the low level signal to the under-voltage protection pin. The first divider unit comprises a first resistor and a second resistor connected in series with first resistor, and the second divider unit comprises a third resistor connected in series with the first resistor and the second resistor.

The under-voltage collecting unit comprises a third divider unit and a fourth divider unit that are connected in series between the input end of the power supply and the ground terminal, and voltage of the fourth divider unit is sent to the under-voltage protection pin. The third divider unit comprises a fourth resistor and a fifth resistor connected in series with the fourth resistor, and the fourth divider unit comprises a sixth resistor connected in series with the fourth resistor and the fifth resistor.

The power supply comprises a first inductor, a first diode, a voltage adjusting controllable switch, and a filter capacitor. A first end of the first inductor is coupled to the input end of the power supply, a second end of the first inductor is coupled to an anode of the first diode, and a cathode of the first diode is connected with an input end of the LED light bar. The filter capacitor is connected in series between the cathode of the first diode and the ground terminal, and the voltage adjusting controllable switch is connected in series between the anode of the first diode and the ground terminal.

The constant current driving chip further comprises a detection unit that detects an output current of the LED light bar, a protection unit coupled to the under-voltage protection pin, and a control unit coupled to the protection unit, where; the control unit controls the power supply to turn on/off. A divider resistor is connected in series between an output end of the LED light bar and the ground terminal, and voltage of the divider resistor is fed back to the detection unit, the detection unit is coupled to the control unit. When the under-voltage protection signal is sent to the protection unit, the protection unit controls the control unit to turn off the voltage adjusting controllable switch of the power supply.

The constant current driving chip further comprises a voltage conversion unit coupled to the input end of the power supply, and the voltage conversion unit outputs the reference voltage to the comparing unit.

The overvoltage collecting unit and the under-voltage collecting unit use the resistor divider method to receive voltage of the input end of the power supply, which simplifies circuit structure and reduces costs. Voltage of the under-voltage protection signal is determined by the protection unit, when the voltage of the under-voltage protection signal is less than a preset voltage, the protection unit sends a protection signal to the control unit, thus the control unit turns off the voltage adjusting controllable switch of the power supply, thereby protecting the LED backlight circuit. The present disclosure transforms an output current of each of the LED light bars into the voltage signal by the resistor divider method. The voltage signal is detected by the detection unit, and current data of each of the LED light bars detected by the detection unit is fed back to the control unit, where the control unit adjusts an output voltage of the power supply by compared current brightness requirement with actual brightness of the LED light bar, where the actual brightness of the LED light bar is obtained through current data of the LED light bar. The voltage conversion unit is integrated in the constant current driving chip, and the reference voltage can be flexibly set according to different overvoltage protection thresholds, thereby improving universality of the constant current driving chip.

A backlight unit comprises a light emitting diode (LED) backlight driving circuit of the present disclosure.

A liquid crystal display (LCD) device comprises the above-mentioned backlight unit.

The present disclosure also uses the overvoltage collecting unit receives voltage of the input end of the power supply, and outputs the voltage to the first input end of the comparing unit. The comparing unit compares the output voltage of the overvoltage collecting unit with the reference voltage VF, and when the output voltage of the overvoltage collecting unit exceeds the reference voltage VF, the comparing unit sends the under-voltage protection signal to the under-voltage protection pin. The under-voltage collecting unit is directly coupled to the under-voltage protection pin. When the voltage of the under-voltage protection signal received by the under-voltage collecting unit is less than a preset voltage, voltage of the under-voltage protection pin automatically increases to a voltage threshold of the under-voltage protection signal, which drives under-voltage protection function of the constant current driving chip. Thus, the constant current driving chip having one under-voltage protection pin can simultaneously perform overvoltage protection and under-voltage protection, which reduces chip cost, expands protection function and application range of the constant current driving chip having one under-voltage protection pin.

DETAILED DESCRIPTION

Figure 1:
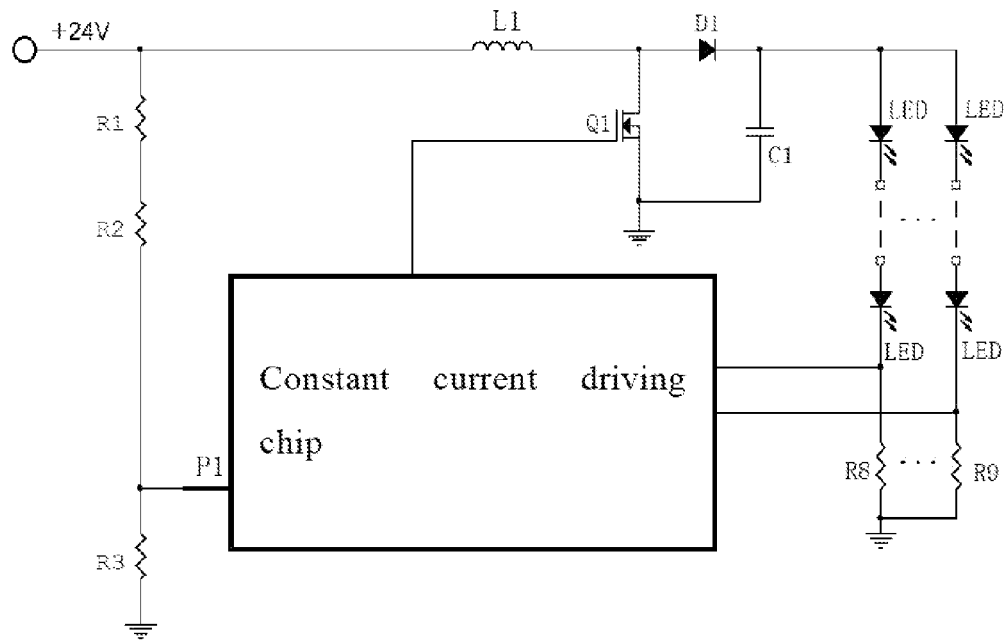
FIG. 1 is a schematic diagram of a typical light emitting diode (LED) backlight driving circuit.
Figure 2:
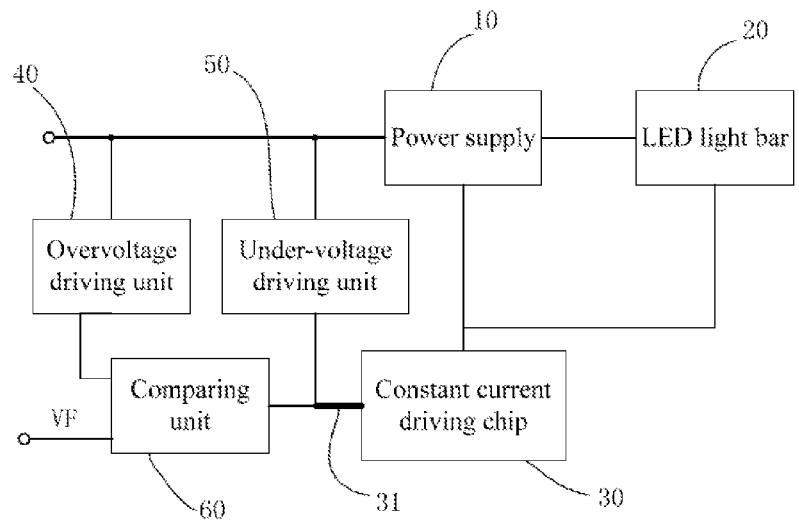
FIG. 2 is a schematic diagram of a light emitting diode (LED) backlight driving circuit of the present disclosure.

The present disclosure provides a liquid crystal display (LCD) device comprising an LCD panel and a backlight unit, where the backlight unit comprises a light emitting diode (LED) backlight driving circuit. As shown in FIG. 2, the LED backlight driving circuit comprises a power supply 10, an LED light bar 20 coupled to the power supply 10, and a constant current driving chip 30 that drives the LED light bar 20 to light. The constant current driving chip 30 comprises an under-voltage protection pin 31 that receives an under-voltage protection signal. An overvoltage collecting unit of the LED backlight driving circuit 40 and an under-voltage collecting unit 50 of the LED backlight driving circuit are coupled to an input end of the power supply, and an output voltage of the under-voltage collecting unit 50 is directly coupled to the under-voltage protection pin 31. The LED backlight driving circuit further comprises a comparing unit 60, where a reference voltage VF is input to a first input end of the comparing unit 60, and a second input end of the comparing unit 60 is coupled to the overvoltage collecting unit 40. When an output voltage of the overvoltage collecting unit 40 exceeds the reference voltage VF, the comparing unit 60 outputs the under-voltage protection signal to the under-voltage protection pin 31.

The present disclosure also uses the overvoltage collecting unit to receive voltage of the input end of the power supply and output voltage to the first input end of the comparing unit. The comparing unit compares the output voltage of the overvoltage collecting unit with the reference voltage VF, and when the output voltage of the overvoltage collecting unit exceeds the reference voltage VF, the comparing unit sends the under-voltage protection signal to the under-voltage protection pin. The under-voltage collecting unit is directly coupled to the under-voltage protection pin. When the voltage of the under-voltage protection signal received by the under-voltage collecting unit is less than a preset voltage, voltage of the under-voltage protection pin automatically increases to a voltage threshold of the under-voltage protection signal, which drives under-voltage protection function of the constant current driving chip. Thus, the constant current driving chip having one under-voltage protection pin can simultaneously perform overvoltage protection and under-voltage protection, which reduces chip cost, expands protection function and application range of the constant current driving chip having one under-voltage protection pin.

The present disclosure will further be described in detail in accordance with the figures and the exemplary examples.

Figure 3:
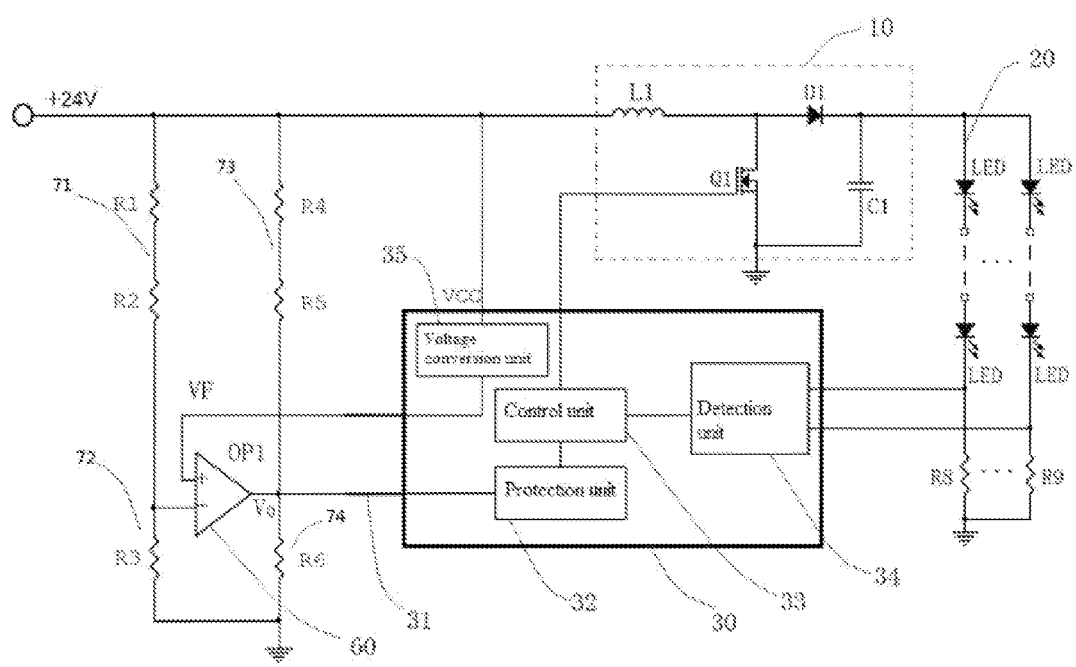
FIG. 3 is a schematic diagram of a light emitting diode (LED) backlight driving circuit of an example of the present disclosure.

As shown in FIG. 3, the LED backlight driving circuit of an example comprises the power supply 10, the LED light bar 20 coupled to the power supply 10, and the constant current driving chip 30 that drives the LED light bar 20 to light. The constant current driving chip 30 comprises the under-voltage protection pin 31 that receives an under-voltage protection signal.

The power supply 10 comprises a first inductor L1, a first diode D1, a voltage adjusting controllable switch Q1, and a filter capacitor C1. A first end of the first inductor L1 is coupled to an input end of the power supply 10, a second end of the first inductor L1 is coupled to an anode of the first diode D1, and a cathode of the first diode D1 is connected with an input end of the LED light bar 20. The filter capacitor C1 is connected in series between the cathode of the first diode D1 and a ground terminal, and the voltage adjusting controllable switch Q1 is connected in series between the anode of the first diode D1 and the ground terminal.

The overvoltage collecting unit 40 and the under-voltage collecting unit 50 are coupled to the input end of the power supply 10, where the output voltage of the under-voltage collecting unit 50 is directly input to the under-voltage protection pin 31. The LED backlight driving circuit further comprises the comparing unit 60, the under-voltage protection signal is a low level signal (logic 0) (as shown in FIG. 3, the voltage $V_O$ is a low voltage). The overvoltage collecting unit 40 comprises a first divider unit 71 and a second divider unit 72 that are connected in series between the input end of the power supply 10 and the ground terminal. A reference voltage VF is input to a non-inverting input end of the comparing unit 60. When an output voltage of the overvoltage collecting unit 40 exceeds the reference voltage VF, the comparing unit 60 sends the under-voltage protection signal to the under-voltage protection pin 31. Voltage of the second divider unit 72 is feed back to an inverting input end of the comparing unit 60, when the voltage of the second divider unit 72 exceeds the reference voltage VF, the comparing unit 60 sends the low level signal to the under-voltage protection pin 31. The first divider unit 71 comprises a first resistor R1 and a second resistor R2 connected in series with the first resistor R1, and the second divider unit 72 comprises a third resistor R3 connected in series with the first resistor R1 and the second resistor R2. The under-voltage collecting unit 50 comprises a third divider unit 73 and a fourth divider unit 74, where the third divider unit 73 and the fourth divider unit 74 are connected in series between the input end of the power supply 10 and the ground terminal, and voltage of the fourth divider unit 74 is input to the under-voltage protection pin 31. The third divider unit 73 comprises a fourth resistor R4 and a fifth resistor R5 connected in series with the fourth resistor R4, and the fourth divider unit 74 comprises a sixth resistor R6 connected in series with the fourth resistor R4 and the fifth resistor R5.

It should be considered that a number of the resistors of the first divider unit, the second divider unit, the third divider unit, and the fourth divider unit can be flexibly adjusted according to different voltages and currents. The overvoltage collecting unit 40 and the under-voltage collecting unit 50 use a resistor divider method to receive the voltage of the input end of the power supply 10, which simplifies circuit structure and reduces costs.

The constant current driving chip 30 further comprises a detection unit 34 that detects an output current of the LED light bar 20, a protection unit 32 coupled to the under-voltage protection pin 31, and a control unit 33 coupled to the protection unit 32, where the control unit controls the power supply 10 to turn on/off. When the under-voltage protection signal is sent to the protection unit 32, the protection unit 32 controls the control unit 33 to turn off the voltage adjusting controllable switch Q1 of the power unit 10. Voltage of the under-voltage protection signal is determined by the protection unit 32, when the voltage of the under-voltage protection signal is less than the preset voltage, the protection unit 32 sends a protection signal to the control unit 33, thus the control unit 33 turns off the voltage adjusting controllable switch Q1 of the power supply 10, thereby protecting the LED backlight circuit.

A divider resistor is connected in series between an output end of the LED light bar 20 and the ground terminal, such as R8 and R9 in FIG. 3, voltage of the divider resistor is fed back to the detection unit 34, and the detection unit 34 is coupled to the control unit 33. The present disclosure transforms the output current of each of the LED light bars 20 into the voltage signal by the resistor divider method. The voltage signal is detected by the detection unit 34, and current data of each of the LED light bars 20 detected by the detection unit 34 is fed back to the control unit 33. The control unit 33 adjusts an output voltage of the power supply 10 by compared current brightness requirement with actual brightness of the LED light bar 20, where the actual brightness of the LED light bar 20 is obtained through current data of the LED light bar 20.

The constant current driving chip 30 further comprises a voltage conversion unit 35 coupled to the input end of the power supply 10, where the voltage conversion unit 35 outputs the reference voltage VF to the comparing unit 60. The voltage conversion unit 35 directly receives voltage from the input end of the power supply 10, and converts the voltage into the reference voltage VF required by the comparing unit 60. The voltage conversion unit 35 is integrated in the constant current driving chip, and the reference voltage VF can be flexibly set according to different overvoltage protection thresholds, thereby improving universality of the constant current driving chip 30.

The present disclosure is described in detail in accordance with the above contents with the specific exemplary examples. However, this present disclosure is not limited to the specific examples. For the ordinary technical personnel of the technical field of the present disclosure, on the premise of keeping the conception of the present disclosure, the technical personnel can also make simple deductions or replacements, and all of which should be considered to belong to the protection scope of the present disclosure.

We claim:

1. A light emitting diode (LED) backlight driving circuit, comprising:
   a power supply;
   an LED light bar coupled to the power supply;
   a constant current driving chip that drives the LED light bar to light; and
   a comparing unit;
   wherein the constant current driving chip comprises an under-voltage protection pin that receives an under-voltage protection signal, and an overvoltage collecting unit of the LED backlight driving circuit and an under-voltage collecting unit of the LED backlight driving circuit are coupled to an input end of the power supply; an output voltage of the under-voltage collecting unit is directly input to the under-voltage protection pin;
   a reference voltage is input to a first input end of the comparing unit, and a second input end of the comparing unit is coupled to the overvoltage collecting unit; when an output voltage of the overvoltage collecting unit exceeds the reference voltage, the comparing unit sends the under-voltage protection signal to the under-voltage protection pin, wherein the under-voltage protection signal is a low level signal; the overvoltage collecting unit comprises a first divider unit and a second divider unit that are connected in series between the input end of the power supply and a ground terminal; the first input end of the comparing unit is a non-inverting input end, and the second input end of the comparing unit is an inverting input end; when voltage of the second divider unit exceeds the reference voltage, the comparing unit sends the low level signal to the under-voltage protection pin.

2. The LED backlight driving circuit of claim 1, wherein the constant current driving chip further comprises a protection unit coupled to the under-voltage protection pin, and a control unit coupled to the protection unit; the control unit controls the power supply to turn on/off; when the under-voltage protection signal is sent to the protection unit, the protection unit controls the control unit to turn off the power supply.

3. The LED backlight driving circuit of claim 2, wherein the constant current driving chip further comprises a detection unit that detects an output current of the LED light bar, and the detection unit is coupled to the control unit; a divider resistor is connected in series between an output end of the LED light bar and a ground terminal, and voltage of the divider resistor is fed back to the detection unit.

4. The LED backlight driving circuit of claim 1, wherein the constant current driving chip further comprises a protection unit coupled to the under-voltage protection pin, and a control unit coupled to the protection unit; the control unit controls the power supply to turn on/off; when the under-voltage protection signal is sent to the protection unit, the protection unit controls the control unit to turn off the power supply;
   the constant current driving chip further comprises a detection unit that detects an output current of the LED light bar, and the detection unit is coupled to the control unit; a divider resistor is connected in series between an output end of the LED light bar and the ground terminal, and voltage of the divider resistor is fed back to the detection unit.

5. The LED backlight driving circuit of claim 1, wherein the under-voltage collecting unit comprises a third divider unit and a fourth divider unit that are connected in series between the input end of the power supply and a ground terminal, voltage of the fourth divider unit is sent to the under-voltage protection pin.

6. The LED backlight driving circuit of claim 5, wherein the constant current driving chip further comprises a protection unit coupled to the under-voltage protection pin, and a control unit coupled to the protection unit; the control unit controls the power supply to turn on/off; when the under-voltage protection signal is sent to the protection unit, the protection unit controls the control unit to turn off the power supply;
   the constant current driving chip further comprises a detection unit that detects an output current of the LED light bar, and the detection unit is coupled to the control unit; a divider resistor is connected in series between an output end of the LED light bar and the ground terminal, and voltage of the divider resistor is fed back to the detection unit.

7. The LED backlight driving circuit of claim 1, wherein the power supply comprises a first inductor, a first diode, a voltage adjusting controllable switch, and a filter capacitor, a first end of the first inductor is coupled to the input end of the power supply, a second end of the first inductor is coupled to an anode of the first diode, and a cathode of the first diode is connected with an input end of the LED light bar the filter capacitor is connected in series between the cathode of the first diode and a ground terminal, and the voltage adjusting controllable switch is connected in series between the anode of the first diode and the ground terminal.

8. The LED backlight driving circuit of claim 7, wherein the constant current driving chip further comprises a protection unit coupled to the under-voltage protection pin, and a control unit coupled to the protection unit; the control unit controls the power supply to turn on/off; when the under-voltage protection signal is sent to the protection unit, the protection unit controls the control unit to turn off the power supply;
   the constant current driving chip further comprises a detection unit that detects an output current of the LED light bar, and the detection unit is coupled to the control unit; a divider resistor is connected in series between an output end of the LED light bar and the ground terminal, and voltage of the divider resistor is fed back to the detection unit.

9. The LED backlight driving circuit of claim 1, wherein the constant current driving chip further comprises a voltage conversion unit coupled to the input end of the power supply, and the voltage conversion unit outputs the reference voltage to the comparing unit.

10. A backlight unit, comprising:
    a light emitting diode (LED) backlight driving circuit;
    wherein the LED backlight driving circuit comprises a power supply, an LED light bar coupled to the power supply, a constant current driving chip that drives the LED light bar to light, and a comparing unit;
    wherein the constant current driving chip comprises an under-voltage protection pin that receives an under-voltage protection signal, and an overvoltage collecting unit of the LED backlight driving circuit and an under-voltage collecting unit of the LED backlight driving circuit are coupled to an input end of the power supply; an output voltage of the under-voltage collecting unit is directly input to the under-voltage protection pin;

a reference voltage is input to a first input end of the comparing unit, and a second input end of the comparing unit is coupled to the overvoltage collecting unit; when an output voltage of the overvoltage collecting unit exceeds the reference voltage, the comparing unit sends the under-voltage protection signal to the under-voltage protection pin, wherein the under-voltage protection signal is a low level signal; the overvoltage collecting unit comprises a first divider unit and a second divider unit that are connected in series between the input end of the power supply and a around terminal; the first input end of the comparing unit is a non-inverting input end, and the second input end of the comparing unit is an inverting input end; when voltage of the second divider unit exceeds the reference voltage, the comparing unit sends the low level signal to the under-voltage protection pin.

11. The backlight unit of claim 10, wherein the constant current driving chip further comprises a protection unit coupled to the under-voltage protection pin, and a control unit coupled to the protection unit; the control unit controls the power supply to turn on/off; when the under-voltage protection signal is sent to the protection unit, the protection unit controls the control unit to turn off the power supply.

12. The backlight unit of claim 11, wherein the constant current driving chip further comprises a detection unit that detects an output current of the LED light bar, and the detection unit is coupled to the control unit; a divider resistor is connected in series between an output end of the LED light bar and a ground terminal, and voltage of the divider resistor is fed back to the detection unit.

13. The backlight unit of claim 10, wherein the under-voltage collecting unit comprises a third divider unit and a fourth divider unit that are connected in series between the input end of the power supply and a ground terminal, and voltage of the fourth divider unit is sent to the under-voltage protection pin.

14. The backlight unit of claim 10, wherein the power supply comprises a first inductor, a first diode, a voltage adjusting controllable switch, and a filter capacitor; a first end of the first inductor is coupled to the input end of the power supply, a second end of the first inductor is coupled to an anode of the first diode, and a cathode of the first diode is connected with an input end of the LED light bar; the filter capacitor is connected in series between the cathode of the first diode and a ground terminal, and the voltage adjusting controllable switch is connected in series between the anode of the first diode and the ground terminal.

15. The backlight unit of claim 10, wherein the constant current driving chip further comprises a voltage conversion unit coupled to the input end of the power supply, and the voltage conversion unit outputs the reference voltage to the comparing unit.

16. A liquid crystal display (LCD) device, comprising:
a backlight unit;
wherein the backlight unit comprises a light emitting diode (LED) backlight driving circuit; the LED backlight driving circuit comprises a power supply, an LED light bar coupled to the power supply, a constant current driving chip that drives the LED light bar to light, and a comparing unit;
wherein the constant current driving chip comprises an under-voltage protection pin that receives an under-voltage protection signal, an overvoltage collecting unit of the LED backlight driving circuit and an under-voltage collecting unit of the LED backlight driving circuit are coupled to an input end of the power supply; an output voltage of the under-voltage collecting unit is directly input to the under-voltage protection pin;
a reference voltage is input to a first input end of the comparing unit, and a second input end of the comparing unit is coupled to the overvoltage collecting unit; when an output voltage of the overvoltage collecting unit exceeds the reference voltage, the comparing unit sends the under-voltage protection signal to the under-voltage protection pin, wherein the under-voltage protection signal is a low level signal; the overvoltage collecting unit comprises a first divider unit and a second divider unit that are connected in series between the input end of the power supply and a ground terminal; the first input end of the comparing unit is a non-inverting input end, and the second input end of the comparing unit is an inverting input end; when voltage of the second divider unit exceeds the reference voltage, the comparing unit sends the low level signal to the under-voltage protection pin.

* * * * *